(12) United States Patent
Siegenthaler et al.

(10) Patent No.: US 8,276,396 B2
(45) Date of Patent: Oct. 2, 2012

(54) OIL COOLED GENERATOR FOR TRAILER REFRIGERATION UNIT

(75) Inventors: David R. Siegenthaler, Verona, NY (US); Gary E. Dickes, Kenosha, WI (US)

(73) Assignee: Carrier Corporation, Farmington, CT (US)

( * ) Notice: Subject to any disclaimer, the term of this patent is extended or adjusted under 35 U.S.C. 154(b) by 586 days.

(21) Appl. No.: 12/521,481

(22) PCT Filed: Dec. 29, 2006

(86) PCT No.: PCT/US2006/049617
§ 371 (c)(1),
(2), (4) Date: Jun. 26, 2009

(87) PCT Pub. No.: WO2008/085152
PCT Pub. Date: Jul. 17, 2008

(65) Prior Publication Data
US 2010/0077786 A1    Apr. 1, 2010

(51) Int. Cl.
*B60H 1/32* (2006.01)
(52) U.S. Cl. .......................... 62/239; 62/468
(58) Field of Classification Search ............. 62/239, 62/244, 323.3, 324.1, 507, 468, 192
See application file for complete search history.

(56) References Cited

U.S. PATENT DOCUMENTS

| | | | |
|---|---|---|---|
| 4,177,017 A * | 12/1979 | Schultz | 417/231 |
| 4,221,982 A * | 9/1980 | Raver et al. | 310/59 |
| 4,262,224 A | 4/1981 | Kofink et al. | |
| 4,341,088 A * | 7/1982 | Mei et al. | 62/239 |
| 4,446,377 A * | 5/1984 | Kure-Jensen et al. | 290/52 |
| 4,712,029 A | 12/1987 | Nold | |
| 4,764,699 A | 8/1988 | Nold | |
| 4,825,531 A | 5/1989 | Nold | |
| 5,127,485 A | 7/1992 | Wakuta et al. | |
| 5,226,294 A * | 7/1993 | Mayer | 62/323.1 |
| 5,418,412 A | 5/1995 | Brucker | |
| 5,632,157 A * | 5/1997 | Sekino et al. | 62/244 |
| 5,718,302 A * | 2/1998 | Hasebe et al. | 180/65.6 |
| 5,797,359 A * | 8/1998 | Freeman | 123/58.5 |
| 5,901,802 A * | 5/1999 | Sunohara et al. | 180/65.6 |
| 5,916,253 A * | 6/1999 | Amr et al. | 62/259.1 |

(Continued)

FOREIGN PATENT DOCUMENTS

CN    1307390 A    8/2001

OTHER PUBLICATIONS

International Search Report and Written Opinion mailed Apr. 2, 2008 (10 pgs.).

(Continued)

*Primary Examiner* — Mohammad Ali
(74) *Attorney, Agent, or Firm* — Cantor Colburn LLP

(57) ABSTRACT

A transport refrigeration unit includes an integrally mounted unitary engine driven generator wherein the generator is cooled by the circulation of oil over the stator coils and the rotor to thereby provide a cooling system that is closed from the outside environment and capable of increased cooling efficiencies. In one embodiment, the circulation of the engine oil is integrated into the generator such that its serves the dual purpose of cooling the generator. In other embodiments, the oil is contained entirely within the generator and is circulated by various means such as by a pump and spray, a slinger or total immersion.

25 Claims, 6 Drawing Sheets

U.S. PATENT DOCUMENTS

| | | | | |
|---|---|---|---|---|
| 5,955,805 A | * | 9/1999 | Chaudoreille et al. | 310/90 |
| 5,960,637 A | * | 10/1999 | Stevens et al. | 62/77 |
| 6,133,659 A | * | 10/2000 | Rao | 310/89 |
| 6,223,546 B1 | | 5/2001 | Chopko et al. | |
| 6,357,248 B1 | * | 3/2002 | Bongaards et al. | 62/263 |
| 6,624,542 B1 | | 9/2003 | Gabrys et al. | |
| 6,750,572 B2 | * | 6/2004 | Tornquist et al. | 310/54 |
| 6,755,041 B2 | * | 6/2004 | Wessells et al. | 62/236 |
| 7,083,014 B2 | * | 8/2006 | Forster | 180/53.4 |
| 7,228,928 B2 | * | 6/2007 | Mizutani et al. | 180/65.51 |
| 2002/0122727 A1 | * | 9/2002 | Gaither | 417/16 |
| 2003/0173840 A1 | | 9/2003 | Seniawski et al. | |
| 2004/0035112 A1 | * | 2/2004 | Bhabra | 60/698 |
| 2004/0154846 A1 | | 8/2004 | Kira | |
| 2005/0016713 A1 | * | 1/2005 | Houck et al. | 165/42 |

OTHER PUBLICATIONS

International Preliminary Report on Patentability mailed Jul. 31, 2009 (9 pgs.).

* cited by examiner

OIL COOLED GENERATOR FOR TRAILER REFRIGERATION UNIT

BACKGROUND OF THE INVENTION

This invention relates generally to transport refrigeration systems and, more particularly, to the cooling of an engine driven generator therefor.

Generally, transport refrigeration systems such as those used on truck trailers, have employed belt driven and/or mechanically linked, shaft driven compressor units and/or belt driven, or otherwise mechanically linked, fan powering systems. That is, the unit engine, such as a diesel engine, is mechanically connected to drive both the compressor unit(s) and the unit refrigeration systems fans and other components.

A significant improvement to such an arrangement was a so called "all electric" transport refrigeration system as described in U.S. Pat. No. 6,223,546, assigned to the assignee of the present invention. In such a unit, a generator is mechanically connected to the system engine and is used to generate the electrical power needed to drive the compressor and the various refrigeration system fans and other components.

Heretofore, such an engine driven generator has been cooled by a fan disposed on one end thereof and adapted to circulate air over the stator and armature components for the cooling thereof. A significant cooling effect is also achieved by moving air over the generator by the condenser fans.

The applicants have recognized that a significant volume of air at a substantially high pressure is required to provide the necessary cooling, particularly for obtaining sufficient circulation through the small openings in the rotor to obtain the required cooling.

Another problem that has been recognized in such air cooled systems is the occurrence of generator shorting that is caused by outside contamination. That is, the transportation environment is a harsh environment and, as the outside air is circulated through the generator, there is a tendency for contaminants to enter the unit and cause an electrical shorting of the windings. This results in damage to the components and to expenses due to down time.

What is needed is an improved method and apparatus for cooling the generator of an electrically powered transport refrigeration unit. Of particular interest is a reduction of size and weight.

SUMMARY OF THE INVENTION

Briefly, in accordance with one aspect of the invention, oil is caused to circulate through and around the critical areas of both the rotor and the stator of a generator so as to bring about the cooling thereof.

By another aspect of the invention, the generator is attached to and driven by the system engine in a cantilevered fashion such that the oil in the generator is used only for cooling and not for lubrication.

In accordance with another aspect of the invention, the oil system of the driving engine is integrated with the generator such that the engine lubrication oil is used to cool the generator.

By yet another aspect of the invention, the oil is circulated to the critical areas within the generator by way of a controlled oil spray By still another aspect of the invention, the oil is isolated within the generator such that the rotor and/or stator components are partially or totally immersed in the oil.

These features provide substantially improved cooling efficiency, which, in turn, may allow for the reduction of weight by a downsizing of the components. Further, they overcome the problems of contamination that has occurred with air cooled products.

In the drawings as hereinafter described, a preferred embodiment and alternative embodiments are depicted; however, various other modifications and alternate constructions can be made thereto without departing from the spirit and scope of the invention.

DESCRIPTION OF THE PREFERRED EMBODIMENT

Figure 1:
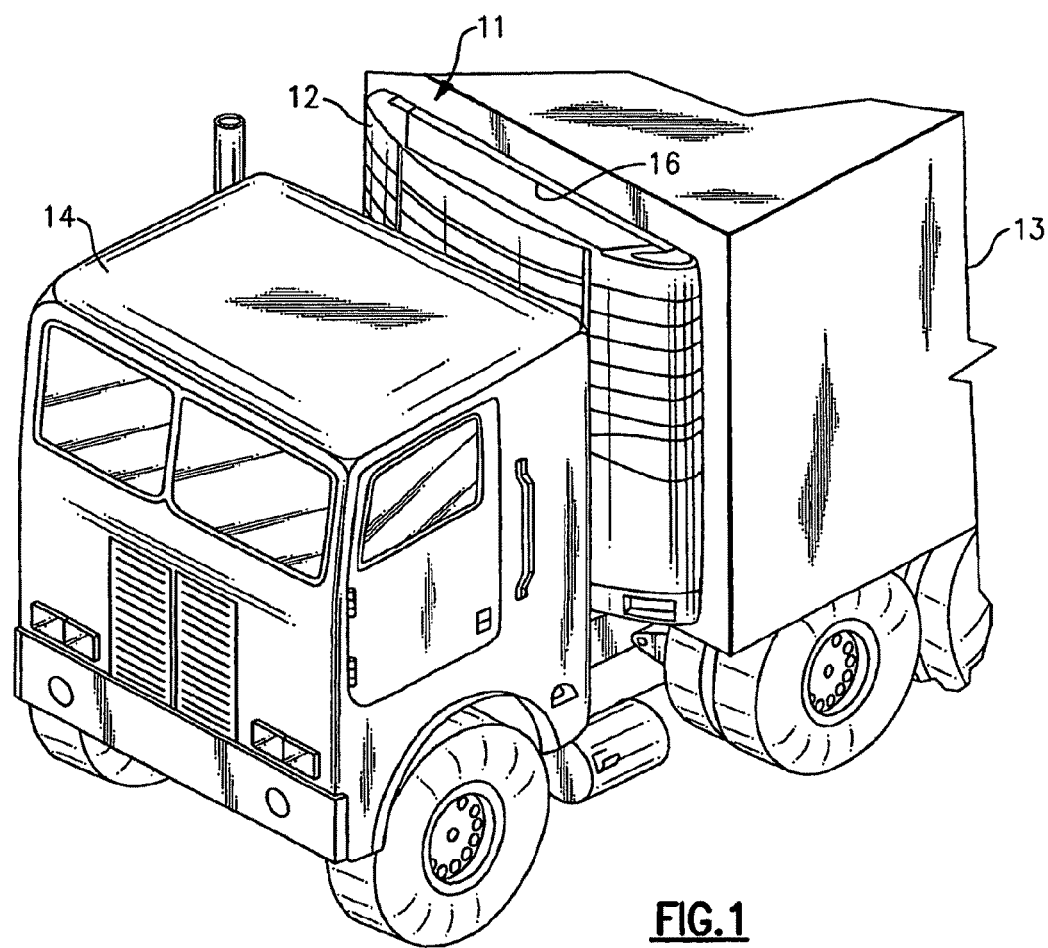
FIG. 1 is a perspective view of a transport refrigeration unit as installed in a truck trailer in accordance with the prior art.

In FIG. 1 there is shown a typical illustration of a trailer refrigeration unit 11 which is enclosed with an outer cover 12 and attached to a truck trailer 13 that is being towed by a truck 14. All of the components of the trailer refrigeration unit 11 and the outer cover 12 are structurally supported by the structural framework 16. As is common for transport refrigeration units, various panels of the outer cover are hinged and are removable to provide ready access to the refrigeration system to perform routine maintenance.

Figure 2:
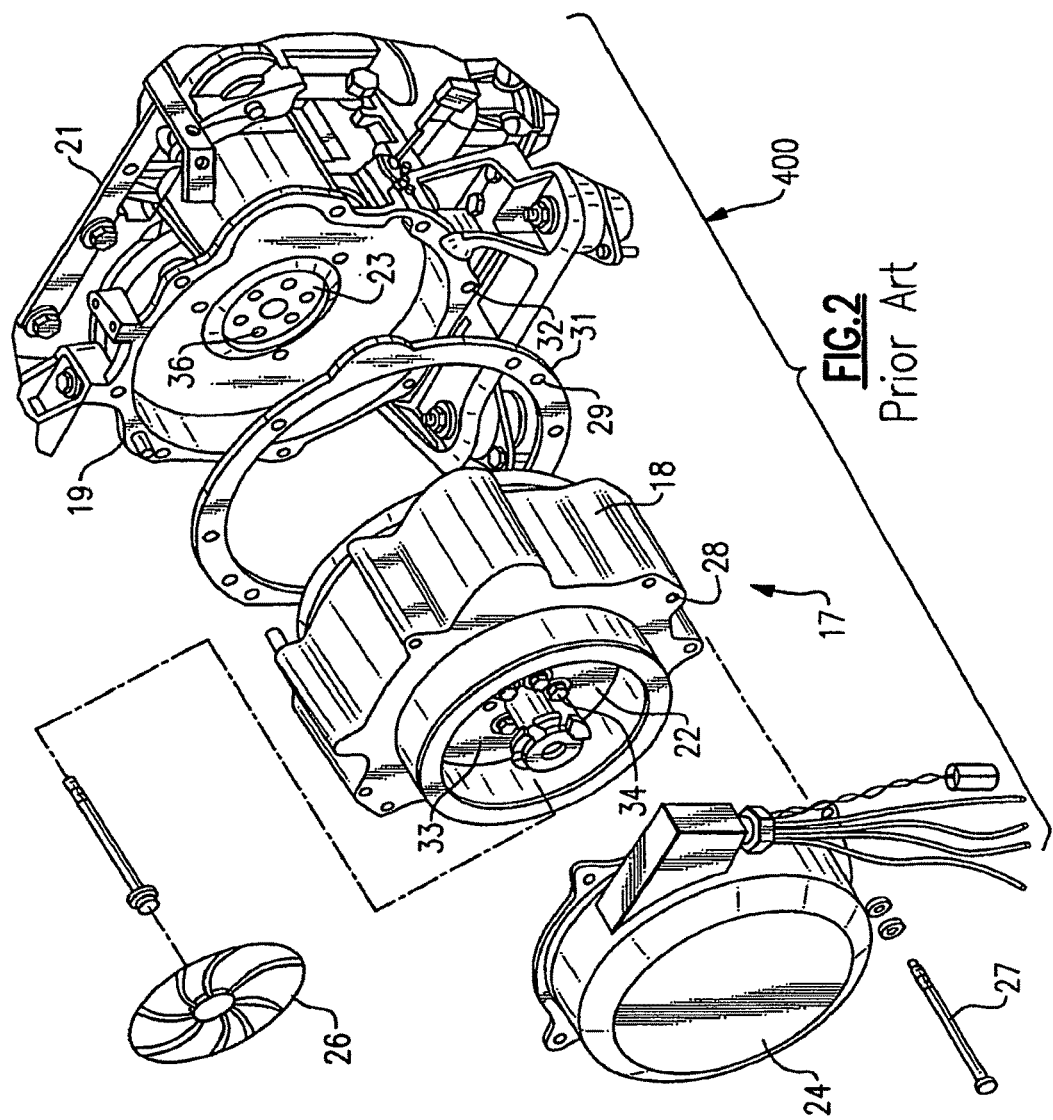
FIG. 2 is an exploded perspective view of an engine driven generator in accordance with the prior art.

FIG. 2 depicts a unitary engine driven generator which is cooled by the circulation of air in accordance with the prior art. The generator 17 includes an outer stator assembly 18 that is fixedly attached to the bell housing 19 of a suitable prime mover such as a diesel engine 21. A rotor assembly 22 is affixed directly to the engine flywheel 23 to create a continuous drive connection between the engine drive shaft, the engine flywheel and the rotor assembly 22 of the generator 17. A cover 24 and a generator cooling fan 26 have been removed to show the details of the rotor assembly 22.

The outer stator assembly 18 includes a core section which may be fabricated from ferrous laminations or powdered metal. A main winding that provides primary power to the refrigeration system and an auxiliary winding that is electrically connected to the battery charging device are disposed in slots in the stator core in the conventional manner. Attachment of the stator assembly 18 to the bell housing 19 is accomplished by use of a series of elongated threaded fasteners 27 passing through mating openings 28 in the stator core. The fasteners 27 in turn pass through axially aligned openings 29 provided in an adaptor plate 31 and thence into axially aligned threaded openings 32 in the bell housing 19.

The rotor assembly 22 includes a steel rotor hub 33 having a plurality of axial openings therethrough which are adapted to receive a plurality of elongated threaded fasteners 34 therethrough. The threaded fasteners 34 are adapted to be received in axially aligned threaded openings 36 in the engine flywheel 23 to provide the integral connection between the rotor assembly 22 and the engine flywheel 23 and drive shaft.

In operation, the diesel engine 21 drives the flywheel 23 and the rotor assembly 22 with its associated rotor magnets, thereby inducing in the stator windings, synchronous voltages in a manner well familiar to those skilled in the art of synchronous generator design. Other details of the prior art system are shown and described in U.S. Pat. No. 6,223,546, assigned to the assignee of the present invention and incorporated herein by reference.

It should be understood that while some cooling of the generator 17 occurs by radiation from the outer stator assembly 18, the primary cooling function is accomplished by the fan 26 which is attached to and driven by the rotor assembly 22 to bring air in through the cover 24 and circulate it through both the stator windings and the rotor. While the stator windings develop a significant amount of heat and require the cooling air to prevent them from reaching excessive temperatures and being damaged thereby, it is also necessary to cool the rotor in order to prevent the permanent magnets from demagnetizing. In this regard, the applicants have found that it is difficult to circulate the air through the rotor because of the rather small openings that are provided for that purpose. For that reason, it is necessary to develop a substantial pressure with the fan 26 in order to penetrate those openings.

Figure 3:
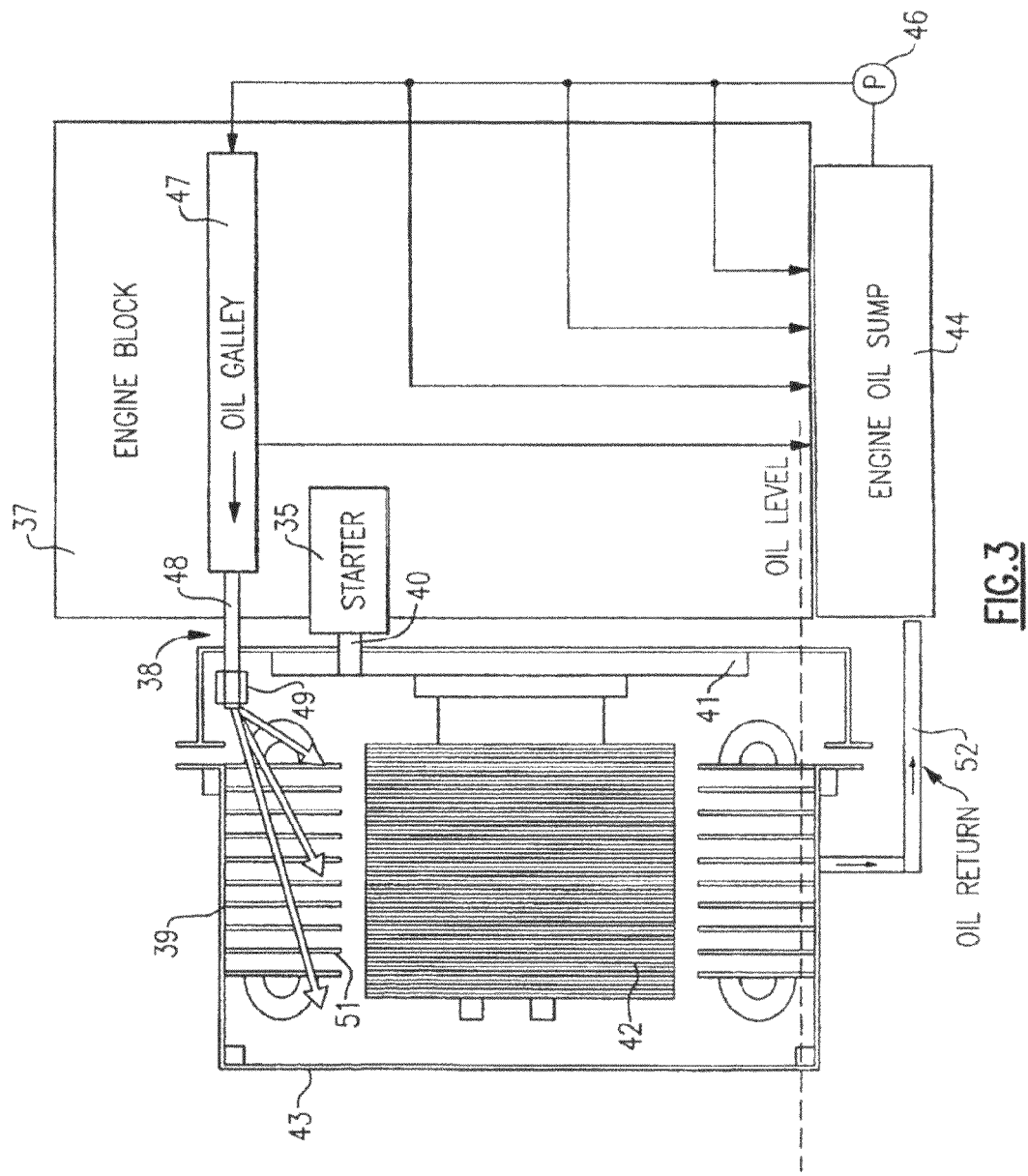
FIG. 3 is a schematic illustration of a generator cooling system in accordance with one embodiment of the invention.

In FIG. 3 there is shown an engine block 37 which is attached to a bell housing 38 and the supported stator assembly 39 in a manner similar to that described hereinabove. In this regard, it should be understood, that the stator may be attached to the bell housing in any of various ways so long as it is prevented from rotation and is sufficiently secured.

The drive shaft of the engine 37 is drivingly attached to the flywheel 41 and the rotor 42 in a similar manner, with the rotor 42 being supported in a cantilevered manner by way of the main bearings in the engine 37. A starter 35 is mechanically connected to the flywheel housing such that the pinion gear 40 makes intermittent contact to crank the engine with a seal being provided between the pinion gear 40 and the bell housing 38. However, rather than being cooled by the circulation of air, the generator 43 is cooled by the circulation of oil therethrough. One advantage to the use of oil is that the specific heat of oil is greater than that of air and greater cooling efficiencies can thus be obtained.

In the embodiment of FIG. 3, the cooling function of the generator 43 is integrated with that of lubricating the engine 37, with the cooling medium being the engine oil.

As standard features of the engine, an oil sump 44 is provided at the bottom end of the engine and a pump 46 circulates the cooling oil to a plurality of galleys one of which is shown at 47. After circulating through those portions of the engine which require lubricating, such as the bearings and the like, the oil again returns to the oil sump 44 to complete the process.

In accordance with one aspect of the present invention, an oil supply line 48 is connected to receive oil from the oil galley 47, with the line 48 then passing in a sealed manner through the bell housing 38 and into the generator 43 to be dispersed to those components requiring cooling. One method of dispersion may be by way of a spraying device 49 which sprays oil in a controlled manner on the windings 51 of the stator. The oil then flows downwardly over the rotor 42 and over the stator windings at the lower end of the generator 43. The oil then collects in the bottom of the generator 43 or other collection point if appropriate, and is caused to flow by gravity and pressure along the oil return line 52 to the engine oil sump 44.

It should be recognized that the oil supply line 48 may be brought into the generator 43 at other locations other than the bell housing as shown. Further, the spraying device 49 may be located at other locations or on the outer side of the generator rather than on the inside thereof as shown. With the design as shown, however, it is necessary to have a sealed relationship between the oil supply line 48 and the bell housing.

A described, the oil that is normally in the engine 37 is pressurized and filtered by the normal engine apparatus and functions. The heat that is transferred to the oil from the generator 43 will be cooled somewhat by radiation from the generator casing. However, the primary oil cooling function is accomplished by way of radiation from the oil sump 44 and by the radiator coolant that is being circulated through the engine 37.

Such a system allows the generator 43 to be cooled by the existing engine oil system with its existing engine pump and filtration system. Further, the existing oil from the engine is sufficient for both purposes, thereby allowing a reduction in weight of the total system. Further, because of higher cooling efficiencies, the size of the rotor and stator components may be reduced to further reduce the weight and fabrication costs of the system.

Figure 4:
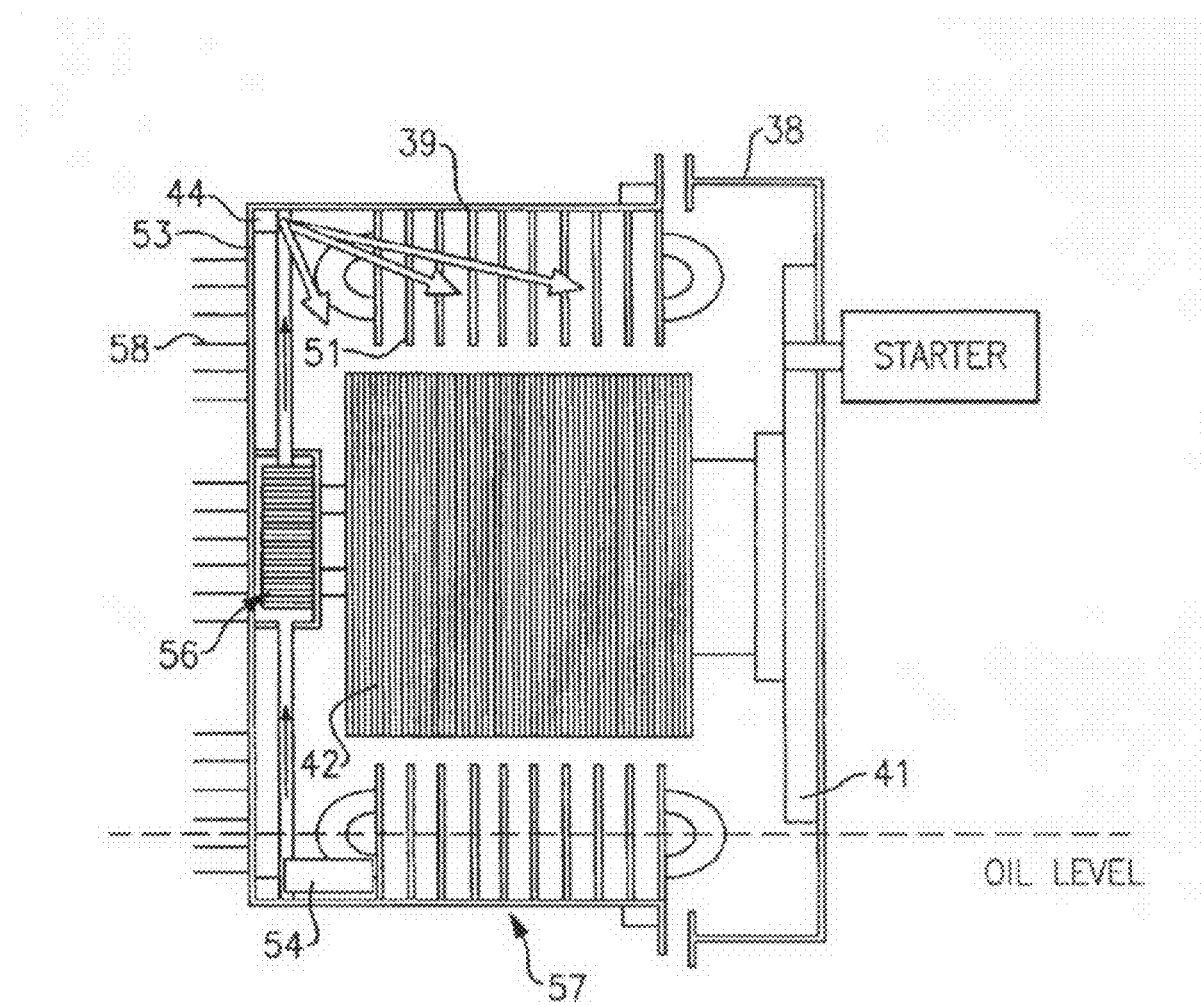
FIG. 4 is an alternative embodiment thereof.
Figure 5:
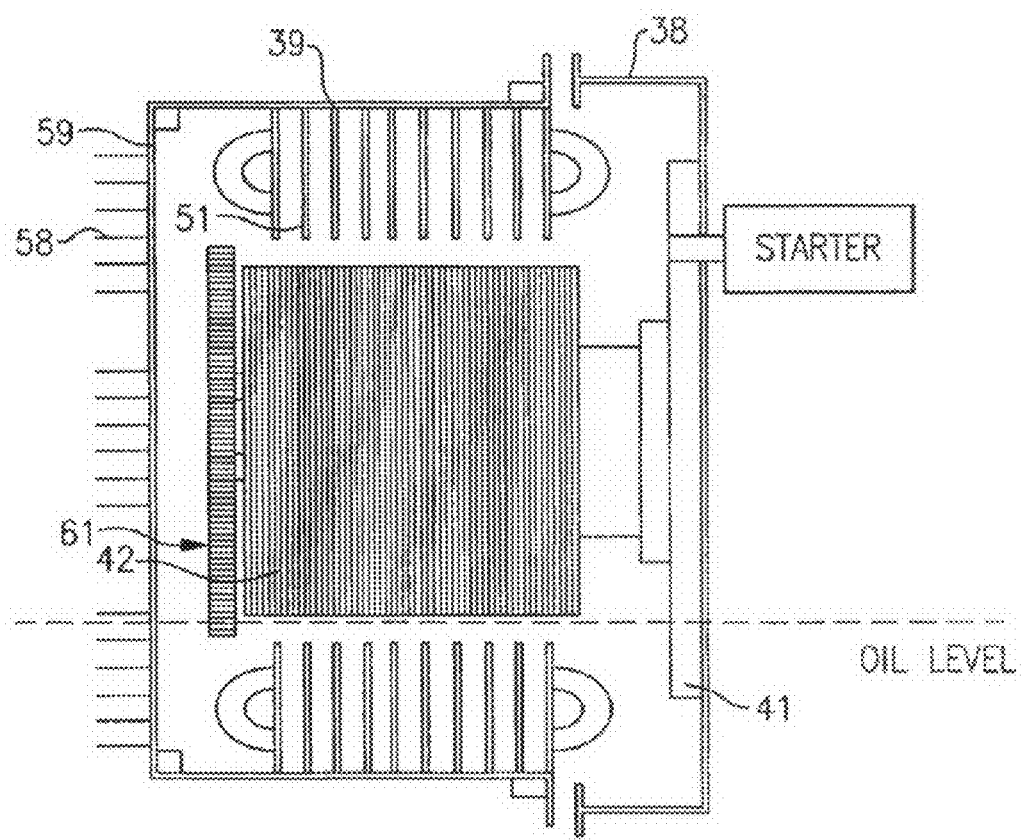
FIG. 5 is another alternative embodiment thereof.
Figure 6:
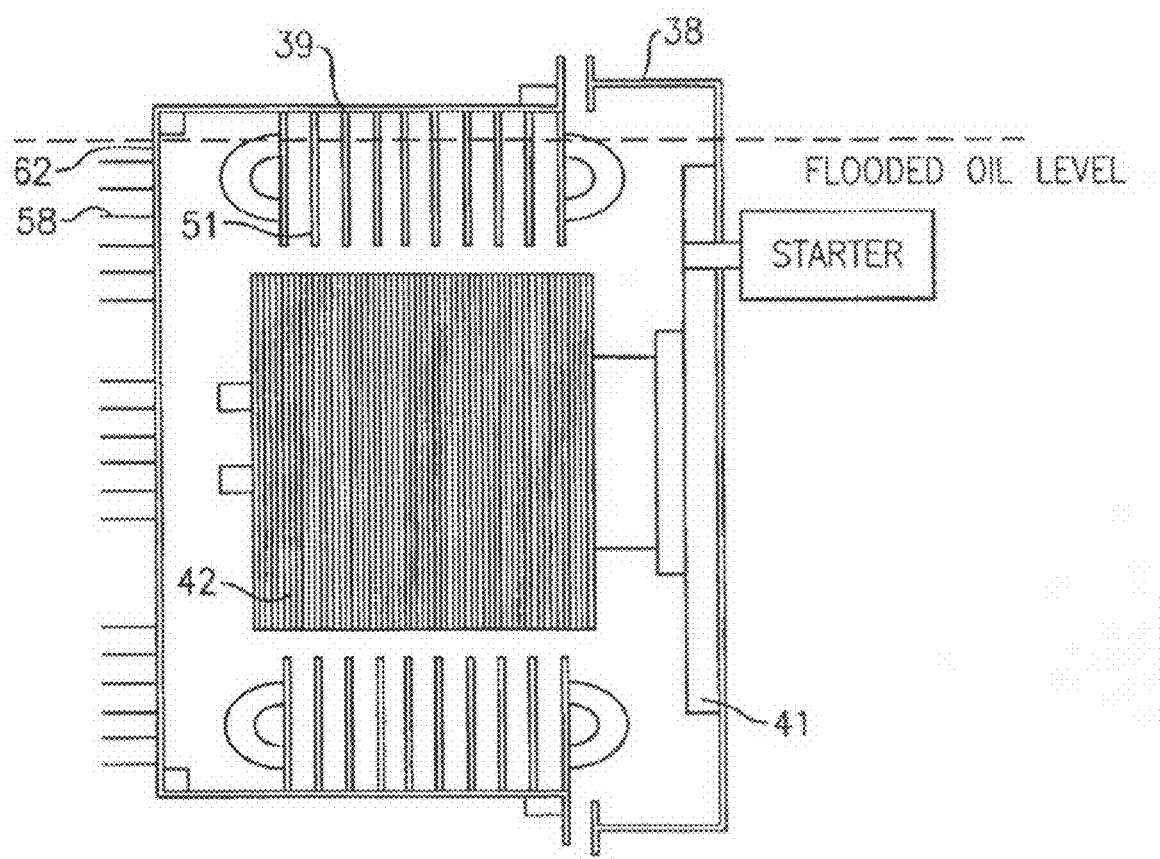
FIG. 6 is yet another alternative embodiment thereof.

The embodiments shown in FIGS. 4, 5 and 6 are similar to the embodiment shown in FIG. 3 in that they use oil as the coolant to be circulated within the generator for cooling purposes. However, rather than being integrated with the oil system of the engine, these embodiments have their own separate oil supply and circulation system which is self-contained within the generator.

As shown in FIG. 4, the cooling function is accomplished by the spraying of oil on the components to be cooled by way of a spraying device 49. However, rather than using the engine oil, a dedicated oil system within the generator is provided. It is estimated that about a quart of oil would be required in the generator 53. An oil pickup tube and a dedicated oil pump 56 are provided to pump the oil upwardly to the spraying device 49. The oil should not have to be changed since it is self contained from contamination and it serves no purpose other than cooling. That is, the rotor 42 is cantilevered out from the engine and the support bearings are lubricated by the engine oil. Thus, the oil in the generator does not serve a lubrication function and should not need to be filtered or changed since it is self contained and not exposed to contamination in the way the engine is.

In this system, the oil is cooled by way of radiation from the stator casing 57. A plurality of fins 58 may be added to the front cover to assist in this process.

In the embodiment shown in FIG. 5, the generator 59 has a dedicated supply of oil in the bottom thereof. Again, it is estimated that a quart of oil will be sufficient for this purpose. However, rather than providing a spraying device, the distribution of the oil is accomplished by way of an oil slinger 61 that is attached to and driven by the rotor 42 such that its periphery extends downwardly into the oil sump such that it tends to sling the oil upwardly to reach the critical areas of the stator and rotor for the cooling thereof. The slinger may have knurled or similar surfaces to assist in the oil pick-up process. It should also be recognized that the flywheel 41, with its associated attached starter ring gear, which extends downwardly below the level of the oil, may also be used for slinging oil upwardly. For that purpose, it may be desired to place fins or the like on the periphery of the flywheel 41. However, it should be kept in mind that the ring gear by itself may be sufficient to accomplish this function.

In the FIG. 6 embodiment, the entire inner space of the generator 62 is substantially filled with oil such that the rotor 42 and the stator windings 51 are immersed in oil. For that purpose, it is estimated that about a gallon of oil should be sufficient for this purpose. Such a system is advantageous in that the device otherwise needed for circulating the oil, such as the spraying device or the oil slinger, is not required.

Further, because the components are always entirely immersed in the oil, more heat will be transferred to that oil. Cooling of the oil is accomplished by way of radiation from the stator casing and from the fins 58.

We claim:

1. A transport refrigeration unit of the type configured to be mounted on the front wall of a transport trailer which is adapted to be connected to and towed by a motorized tractor, comprising:
   a structural support framework configured to be attached to the front wall of the transport trailer;
   an outer cover configured to be supported by said framework; and
   the following components, all supported by said framework and contained within said outer cover:
   a compressor having a discharge port and a suction port and further having an electric compressor drive motor hermetically disposed therein;
   a condenser heat exchanger operatively coupled to said compressor discharge port;
   an evaporator heat exchanger unit operatively coupled to said compressor suction port;
   at least one fan assembly having at least one electric fan motor configured to provide air flow over at least one of said heat exchangers;
   an integrally mounted unitary engine-driven generator assembly, with the generator assembly having a stator with windings and a rotor for producing electrical power to drive at least some of the aforementioned components; and
   a supply of engine lubricating oil provided to said generator stator and rotor in sufficient quantity to provide the necessary cooling to allow sustained operation thereof wherein said oil supply is integral with the engine lubricating oil in the engine and is caused to flow from one or more galleys in a portion of the engine to a portion of the generator stator; and
   a spray device that receives the engine lubricating oil from said one or more galleys and sprays the engine lubricating oil on the stator windings at an upper end of the generator to flow downwardly over the generator rotor and over the stator windings at a lower end of the generator.

2. The transport refrigeration unit as set forth in claim 1 and including an oil return line to conduct the flow of oil from a collection portion of the generator to said engine.

3. A transport refrigeration unit of the type configured to be mounted on the front wall of a transport trailer which is adapted to be connected to and towed by a motorized tractor, comprising:
   a structural support framework configured to be attached to the front wall of the transport trailer;
   an outer cover configured to be supported by said framework; and
   the following components, all supported by said framework and contained within said outer cover:
   a compressor having a discharge port and a suction port and further having electric compressor drive motor hermetically disposed therein;
   a condenser heat exchanger operatively coupled to said compressor discharge port;
   an evaporator heat exchanger unit operatively coupled to said compressor suction port;
   at least one fan assembly having at least one electric fan motor configured to provide air flow over at least one of said heat exchangers;
   an integrally mounted unitary engine-driven generator, with the generator having a stator and a rotor for producing electrical power to drive at least some of the aforementioned components; and
   a supply of oil contained within the generator in sufficient quantity to provide the necessary cooling to allow sustained operation thereof wherein the entire oil supply is contained within said generator.

4. The transport refrigeration unit as set forth in claim 3 further comprising a circulation system including a spray device and an oil pump for pumping the oil from a collection point within the generator to the spray device for delivering oil to critical areas that need to be cooled.

5. The transport refrigeration unit as set forth in claim 4 wherein said pump is driven by the shaft of said rotor.

6. The transport refrigeration unit as set forth in claim 3 wherein the volume of oil in the generator is sufficient to cool the generator.

7. The transport refrigeration unit as set forth in claim 3 wherein said generator includes a slinger, and the oil is distributed to critical areas that need to be cooled within the generator by said slinger.

8. The transport refrigeration unit as set forth in claim 7 wherein said oil slinger is driven by the shaft of said rotor.

9. The transport refrigeration unit as set forth in claim 7 and including a flywheel which is partially immersed in oil and which acts to distribute the oil into the generator.

10. The transport refrigeration unit as set forth in claim 3 wherein the generator is substantially filled with oil such that the rotor is completely immersed therein.

11. The transport refrigeration unit as set forth in claim 10 and including a flywheel within said generator for causing a mixing of the oil within the generator.

12. A cooling apparatus for a transport refrigeration system of the type having an electrically driven compressor and fans and an integrally mounted unitary engine driven generator with a stator and rotor for generating electrical power to drive said compressor and fans, comprising:
    a supply of oil for disposition within the internal confines of the generator, said oil supply being of sufficient quantity to provide the necessary cooling effect to allow sustained operation of the generator wherein said oil supply is integral with the oil in the engine and is caused to flow from one or more galleys in an upper portion of the engine to the generator stator in the upper portion thereof; and
    a spray device that receives the engine lubricating oil from said one or more galleys and sprays the engine lubricating oil on the stator windings at an upper end of the generator to flow downwardly over the generator rotor and over the stator windings at a lower end of the generator.

13. The cooling apparatus as set forth in claim 12 and including an oil return line from a collection point within the generator to said engine.

14. The cooling apparatus as set forth in claim 12 wherein said oil is cooled by radiation from a casing of said stator.

15. A cooling apparatus for a transport refrigeration system of the type having an electrically driven compressor and fans and an integrally mounted unitary engine driven generator with a stator and rotor for generating electrical power to drive said compressor and fans, comprising:
    a supply of oil contained within the internal confines of the generator, said oil supply being of sufficient quantity to provide the necessary cooling effect to allow sustained operation of the generator wherein the entire oil supply is contained entirely within said generator.

16. The cooling apparatus as set forth in claim 15 and including an oil pump for pumping the oil from a collection point of the generator to an upper portion thereof.

17. The cooling apparatus as set forth in claim 16 wherein said pump is driven by the shaft of said rotor.

18. The cooling apparatus as set forth in claim 15 wherein said generator includes a slinger and the oil is distributed within the generator by said slinger.

19. The cooling apparatus as set forth in claim 18 wherein said oil slinger is driven by the shaft of said rotor.

20. The cooling apparatus as set forth in claim 18 and including a flywheel which is partially immersed in oil and which acts to distribute the oil into the generator.

21. The cooling apparatus unit as set forth in claim 15 wherein the generator is substantially filled with oil such that the rotor is completely immersed therein.

22. The cooling apparatus as set forth in claim 21 and including a flywheel within said generator for causing a mixing of the oil within the generator.

23. A cooling apparatus for a transport refrigeration system of the type having an electrically driven compressor and fans and an integrally mounted unitary engine driven generator with a stator and rotor for generating electrical power to drive said compressor and fans, comprising:

a supply of oil for disposition within the internal confines of the generator, said oil supply being in direct contact with said rotor and stator and being of sufficient quantity to provide the necessary cooling effect to allow sustained operation of the generator wherein the entire oil supply is contained entirely within said generator and wherein said oil is cooled only by radiation from a casing of said stator.

24. A transport refrigeration unit of the type configured to be mounted on a transport trailer, comprising:

an engine-driven generator, with the generator having a stator and a rotor for producing electrical power to drive at least some of the aforementioned components; and a supply of oil contained within the generator in sufficient quantity to provide the necessary cooling to allow sustained operation thereof, wherein the entire oil supply is contained within said generator and wherein said oil is cooled only by radiation from a casing of said stator.

25. The transport refrigeration unit of claim 24 further comprising a plurality of fins on the casing of the stator.

* * * * *